United States Patent Office 3,154,547
Patented Oct. 27, 1964

3,154,547
PROCESS FOR PREPARING 2-AMINO-s-TRIAZINES
Kenneth Robert Huffman, Stamford, Conn., and Frederic Charles Schaefer, Munich-Solln, Germany, assignors to American Cyanamid Company, Stamford, Conn., a corporation of Maine
No Drawing. Filed Mar. 5, 1963, Ser. No. 262,857
6 Claims. (Cl. 260—249.5)

This invention relates to a process for preparing 2-amino-s-triazines. More particularly, it relates to a process for preparing 2-amino-s-triazines having substituents in the 4- and 6-positions of the triazine nucleus.

Methods are known for the preparation of 2-amino-s-triazines. Such procedures are summarized by E. M. Smolin and L. Rapoport in "s-Triazine and Derivatives," Interscience Publishers, Incorporated, New York, (1959), pp. 219 ff. The methods there described, however, are of limited applicability in that certain of the methods require numerous steps leading to the preparation of the 2-amino-s-triazines while others are suitable only for the preparation of certain members of the 2-amino-s-triazine series. In view of the disadvantages of the prior methods described in the Smolin and Rapoport monograph, the need for a process for the preparation of 2-amino-s-triazines in which ease of preparation and wide applicability are found has been apparent.

It has now been discovered that 2-amino-s-triazines of the formula:

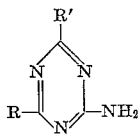

in which R is hydrogen, alkyl, halo- and aryl-substituted alkyl, aryl and halo- nitro- and alkyl-substituted aryl and R' is hydrogen, alkyl, halo- carbalkoxy- and aryl-substituted alkyl, aryl, halo-, nitro- and alkyl-substituted aryl, alkoxy, alkylthio, amino, alkyl- and aryl-substituted amino may be readily prepared in good yield and in excellent purity by reacting an N-cyanoimidate with an amidine in an inert reaction medium at temperatures of from about 0 to about 50° C. and preferably from about 20 to about 30° C. according to the following equation:

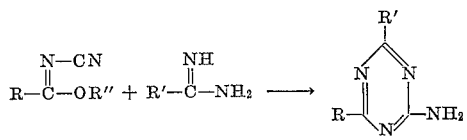

in which R and R' are each as defined hereinabove and R" is lower alkyl, e.g., methyl, ethyl, propyl, isopropyl, butyl and isobutyl.

The procedure for obtaining 2-amino-s-triazines by the process of this invention is generally carried out merely by mixing the N-cyanoimidate and amidine reactants in an inert reaction medium, e.g., a lower alcohol such as methyl alcohol, ethyl alcohol, etc., with stirring and cooling. Since the free amidines are usually unstable, they are usually first generated by treating an amidine hydrohalide with an alkali metal alkoxide. The free amidine is then admitted directly into the reaction vessel after removal of by-product alkali metal halide. Subsequently, the product 2-amino-s-triazine crystallizes directly from the reaction mixture. In some instances where crystallization does not take place readily, the solvent is evaporated after an appropriate time and the residue is then crystallized from an inert solvent such as benzene, ether, alcohol, or the like.

The N-cyanoimidate reactants which may be employed in the process of the present invention are described and claimed in copending application Serial No. 262,851, filed concurrently herewith by Frederic Charles Schaefer and Kenneth Robert Huffman. This copending application also discloses and claims processes for preparing N-cyanoimidates by reaction of an ortho ester with cyanamide, in the presence of an acid or acid anhydride, by reaction of a ketene acetal with cyanamide, by reaction of an imidate hydrohalide with cyanamide, and by reaction of an imidate with a cyanogen halide.

Suitable N-cyanoimidates which may be employed in the process of this invention are methyl N-cyanoacetimidate, ethyl N-cyanoacetimidate, methyl N-cyano-2-phenylacetimidate, methyl 2-chloro-N-cyanoacetimidate, ethyl 2-chloro-N-cyano-acetimidate, methyl N-cyanobenzimidate, ethyl N-cyanoformimidate and the like.

Any of a large variety of amidines may be employed in the process of this invention. Typical amidines are included in the following non-limiting listing: formamidine, acetamidine, propionamidine, butyramidine, lauramidine, benzamidine, p-nitrobenzamidine, p-chlorobenzamidine, p-toluamidine, α-naphthamidine, α-phenylacetamidine, O-methylisourea, S-methylisothiourea, S-ethylisothiourea, S-phenylisothiourea, chloroacetamidine, trichloroacetamidine, 2-carbethoxyacetamidine, 2,2-diethoxy-acetamidine, β-hydroxypropionamidine, α-chloropropionamidine, 2-(1-isobutoxy) - propionamidine, 2 - acetoxypropionamidine, guanidine, N-dodecylguanidine, N-phenylguanidine, and the like.

The process of this invention is useful for the preparation of 2-amino-s-triazines which are useful in agricultural applications. Thus, compounds in which R is ClCH₂ and R' is amino, methoxy or phenyl are useful as precursors of thiophosphate insecticides. Thus, such 2-amino-s-triazines may be reacted with a sodium or ammonium O,O-dialkylphosphorothiolothionate. In addition, such 2-amino-s-triazines having a chloromethyl substituent are also valuable as effective herbicides.

In order to illustrate the present invention the following examples are given.

EXAMPLE 1

A solution of 1.1 parts (0.020 mole) of sodium methoxide in 20 parts methanol is mixed with 2.0 parts (0.02 mole) of acetamidine hydrochloride. The mixture is shaken and then filtered to a suitable reaction vessel containing 2.0 parts (0.020 mole) of methyl N-cyanoacetimidate with stirring. The reaction mixture is cooled to maintain the temperature of the reaction mixture at 25–30° C. and is then allowed to stand for three hours. The product is crystallized directly from the reaction mixture.

EXAMPLES 2–12

The procedure of Example 1 is repeated in all essential respects using the N-cyanoimidate and amidine reactants more fully identified in the headnote of the following table.

Results obtained in Examples 1–12 are also compiled in the table.

Table

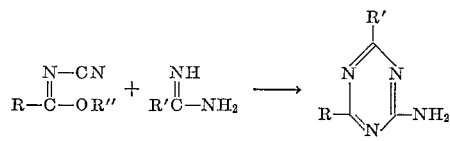

| Example | R | R' | R'' | Reaction time (hrs.) | Yield, percent | M.P., °C. | Formula | Carbon, percent | | Hydrogen, percent | | Nitrogen, percent | |
|---|---|---|---|---|---|---|---|---|---|---|---|---|---|
| | | | | | | | | Calcd. | Found | Calcd. | Found | Calcd. | Found |
| 1 | CH₃ | CH₃ | CH₃ | 3 | 84 | 170–171 | C₅H₈N₄ | | | | | | |
| 2 | CH₃ | C₆H₅ | CH₃ | 3 | 76 | 156.5–158 | C₁₀H₁₀N₄ | 64.50 | 64.32 | 5.41 | 5.39 | 30.09 | 30.26 |
| 3 | CH₃ | NH₂ | C₂H₅ | 0.5 | 77 | 276–277 | C₄H₇N₅ | | | | | | |
| 4 | CH₃ | CH₃O₂CCH₂ | C₂H₅ | 2 | 38 | 117.5–119.5 | C₇H₁₀N₄O₂ | 46.15 | 46.04 | 5.52 | 5.41 | 30.76 | 30.22 |
| 5 | CH₃ | C₂H₅O₂CCH₂ | C₂H₅ | 18 | 27 | 125–126 | C₈H₁₂N₄O₂ | 48.97 | 48.92 | 6.17 | 6.16 | 28.56 | 28.62 |
| 6 | CH₃ | CH₃O | C₂H₅ | 2 | 45 | 257–259 | C₅H₈N₄O | 42.85 | 43.00 | 5.75 | 6.00 | 39.98 | 39.77 |
| 7 | CH₃ | p-NO₂—C₆H₅ | C₂H₅ | 2 | 60 | 267–268 | C₁₀H₉N₅O₂ | 51.94 | 52.24 | 3.92 | 4.32 | 30.29 | 30.50 |
| 8 | H | NH₂ | C₂H₅ | 1 | 87 | >300 | C₃H₅N₅ | | | | | | |
| 9 | H | C₆H₅ | C₂H₅ | 0.5 | 29 | 203.5–204.5 | C₉H₈N₄ | | | | | | |
| 10 | ClCH₂ | C₆H₅ | C₂H₅ | 0.5 | 23 | 145–147 | C₁₀H₉N₄Cl | 54.43 | 54.66 | 4.11 | 4.16 | 25.39 | 25.46 |
| 11 | ClCH₂ | CH₃O | C₂H₅ | 0.25 | 63 | 164–165 | C₅H₇N₄OCl | 34.40 | 34.36 | 4.04 | 4.01 | 32.09 | 32.25 |
| 12 | C₆H₅ | CH₃ | CH₃ | 1 | 54 | 156–158 | C₁₀H₁₀N₄ | | | | | | |

While the present invention has been described in detail as to specific embodiments thereof, it is not intended that these details constitute undue limitations upon the scope of the invention, excepting, of course, insofar as these limitations appear in the appended claims.

We claim:

1. A process for preparing a 2-amino-s-triazine of the formula:

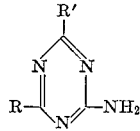

in which R is selected from the group consisting of hydrogen, alkyl, halo- and aryl-substituted alkyl, aryl and halo-, nitro- and alkyl-substituted aryl and R' is selected from the group consisting of hydrogen, alkyl, halo-, carbalkoxy- and aryl-substituted alkyl, aryl, halo-, nitro- and alkyl-substituted aryl, alkoxy, alkylthio, amino, alkyl- and aryl-substituted amino which comprises bringing into reactive contact at a temperature of from about 0° C. to about 50° C. an N-cyanoimidate of the formula:

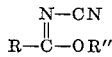

in which R is as defined hereinabove and R'' is lower alkyl with an amidine of the formula:

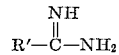

in which R' is as defined hereinabove.

2. A process as in claim 1 in which reactive contact is established in an inert reaction medium.

3. A process as in claim 2 in which R, R' and R'' are each methyl.

4. A process as in claim 2 in which R is methyl, R' is phenyl and R'' is methyl.

5. A process as in claim 2 in which R is chloromethyl, R' is methoxy and R'' is ethyl.

6. A process as in claim 2 in which R is hydrogen, R' is amino and R'' is ethyl.

References Cited in the file of this patent

UNITED STATES PATENTS 2,953,563    Schaefer et al.    Sept. 20, 1960

FOREIGN PATENTS 1,053,513    Germany    Mar. 26, 1959

OTHER REFERENCES

Smolin et al.: "s-Triazines and Derivatives" Interscience Pub. In re N.Y. (1959), pages 219–222, 153, 154 and 157–160.

UNITED STATES PATENT OFFICE
CERTIFICATE OF CORRECTION

Patent No. 3,154,547                          October 27, 1964

Kenneth Robert Huffman et al.

It is hereby certified that error appears in the above numbered patent requiring correction and that the said Letters Patent should read as corrected below.

Columns 3 and 4, in the table, under the heading "Formula", and opposite Example 4, for "$C_7H_{10}H_4O_2$" read -- $C_7H_{10}N_4O_2$ --.

Signed and sealed this 16th day of February 1965.

(SEAL)
Attest:

ERNEST W. SWIDER                                      EDWARD J. BRENNER
Attesting Officer                                         Commissioner of Patents